United States Patent
Kreisler

(10) Patent No.: US 6,254,782 B1
(45) Date of Patent: *Jul. 3, 2001

(54) METHOD FOR RECOVERING AND SEPARATING METALS FROM WASTE STREAMS

(76) Inventor: Lawrence Kreisler, c/o KBF Pollution Management, Inc. 1 KBF Plz., Jasper St., Paterson, NJ (US) 07522

( * ) Notice: Subject to any disclaimer, the term of this patent is extended or adjusted under 35 U.S.C. 154(b) by 0 days.

This patent is subject to a terminal disclaimer.

(21) Appl. No.: 09/080,556

(22) Filed: May 18, 1998

Related U.S. Application Data

(63) Continuation-in-part of application No. 09/003,417, filed on Jan. 6, 1998, now Pat. No. 5,908,559, which is a continuation of application No. 08/696,321, filed on Aug. 13, 1996, now Pat. No. 5,753,125, which is a continuation-in-part of application No. 08/445,353, filed on May 19, 1995, now abandoned.

(51) Int. Cl.[7] .................................................. C02F 1/62
(52) U.S. Cl. .................... 210/710; 75/393; 75/416; 210/719; 210/720; 210/721; 210/725; 210/727; 210/728; 210/764; 210/912; 210/913; 210/747; 588/15; 588/20; 204/DIG. 13
(58) Field of Search .................... 75/416, 417, 393; 204/DIG. 13; 210/709, 710, 719, 720, 721, 723, 725, 727, 743, 912, 724, 726, 728, 913, 764, 747; 423/11, 15; 588/15, 20

(56) References Cited

U.S. PATENT DOCUMENTS

| | | | |
|---|---|---|---|
| 3,899,322 | 8/1975 | Yosim et al. | 75/65 R |
| 3,966,601 | 6/1976 | Stevenson et al. | 210/53 |
| 4,135,923 | 1/1979 | Day | 75/153 |
| 4,260,493 * | 4/1981 | Kretas et al. | 210/714 |
| 4,364,773 | 12/1982 | Veronneau et al. | 423/34 |
| 4,387,034 | 6/1983 | Unger et al. | 252/61 |
| 4,406,696 | 9/1983 | Hans et al. | 75/72 |
| 4,465,593 * | 8/1984 | Wemhoff | 210/96.1 |
| 4,561,887 | 12/1985 | Domic et al. | 75/72 |
| 4,578,195 | 3/1986 | Moore et al. | 210/679 |
| 4,612,125 | 9/1986 | Elfline | 210/724 |
| 4,678,584 | 7/1987 | Elfline | 210/719 |
| 4,943,377 | 7/1990 | Legare, III | 210/709 |
| 4,957,634 | 9/1990 | Bowers, Jr. | 210/711 |
| 5,008,017 | 4/1991 | Kiehl et al. | 210/710 |
| 5,045,213 | 9/1991 | Bowers | 210/709 |
| 5,128,047 | 7/1992 | Stewart et al. | 210/724 |
| 5,177,304 | 1/1993 | Nagel | 588/201 |
| 5,178,772 | 1/1993 | Daley et al. | 210/721 |
| 5,191,154 | 3/1993 | Nagel | 588/201 |
| 5,202,100 | 4/1993 | Nagel et al. | 423/5 |
| 5,205,939 | 4/1993 | Syrinek | 210/727 |
| 5,264,135 | 11/1993 | Mohn | 210/710 |
| 5,298,233 | 3/1994 | Nagel | 422/129 |
| 5,301,620 | 4/1994 | Nagel et al. | 110/346 |
| 5,322,547 | 6/1994 | Nagel et al. | 75/414 |
| 5,324,341 | 6/1994 | Nagel et al. | 75/503 |
| 5,354,940 | 10/1994 | Nagel | 588/201 |
| 5,358,549 | 10/1994 | Nagel et al. | 75/414 |
| 5,358,697 | 10/1994 | Nagel | 422/184 |
| 5,364,441 | 11/1994 | Worner | 75/10.1 |
| 5,372,726 | 12/1994 | Straten | 210/728 |
| 5,395,405 | 3/1995 | Nagel et al. | 48/92 |
| 5,401,420 | 3/1995 | Siefert et al. | 210/709 |
| 5,435,982 | 7/1995 | Wilkinson | 588/201 |
| 5,436,210 | 7/1995 | Wilkinson et al. | 588/201 |
| 5,443,572 | 8/1995 | Wilkinson et al. | 266/46 |
| 5,505,857 * | 4/1996 | Misra et al. | 210/709 |
| 5,510,040 | 4/1996 | Miller et al. | 210/721 |
| 5,753,125 * | 5/1998 | Kriesler | 210/710 |
| 5,908,559 * | 6/1999 | Kriesler | 210/710 |

FOREIGN PATENT DOCUMENTS

| | | |
|---|---|---|
| WO 91/08023 | 6/1991 | (WO) . |
| WO 93/02750 | 2/1993 | (WO) . |
| WO 93/25277 | 12/1993 | (WO) . |
| WO 93/25278 | 12/1993 | (WO) . |
| WO 95/17359 | 6/1995 | (WO) . |
| WO 95/17360 | 6/1995 | (WO) . |
| WO 95/17362 | 6/1995 | (WO) . |

* cited by examiner

Primary Examiner—Peter A. Hruskoci
(74) Attorney, Agent, or Firm—Stephen E. Feldman

(57) ABSTRACT

A method is disclosed for recovering and separating precious and non-precious metals from waste streams, which removes, separates, and recovers such metals in a cost effective manner with more than 95% removal form waste streams and with minimal amounts of unprocessed solids and sludge remaining in the environment. Metals such as chromium, manganese, cobalt, nickel, copper, zinc, silver, gold, platinum, vanadium, sodium, potassium, beryllium, magnesium, calcium, barium, lead, aluminum, tin; and the lie are removed and recovered from the waste streams with at least 95% removal and other metals and compounds, such as antimony, sulfur, and selenium are removed and recovered from waste streams with at least 50% removal. The method employs a unique complexing agent comprising a carbamate compound and an alkali metal hydroxide which facilitates the formation of the metals into ionic metal particles enabling them to be readily separated, removed and recovered. The method disclosed is also applicable to recover metals and other compounds originating from different waste sources such as existing and abandonedamines, contaminated, ground water, standing contaminated water, low level radioactive waste water and waste streams having a high solids content as well as treating water intended for potable use, recovering metals and other compounds from polluted or contaminated air, and the like.

19 Claims, No Drawings

METHOD FOR RECOVERING AND SEPARATING METALS FROM WASTE STREAMS

FIELD OF THE INVENTION

This application is a continuation-in-part of application Ser. No. 09/003,417 filed Jan. 6, 1998 now U.S. Pat. No. 5,908,559, which is a continuation of Ser. No. 08/696,321 filed Aug. 13, 1996 now U.S. Pat. No. 5,753,125 which, in turn, is a continuation-in-part of application Ser. No. 08/445,353 filed May 19, 1995 now abandoned.

The present invention relates generally to a method for removing precious and non-precious metals from hazardous and non-hazardous waste streams, and more particularly to a method for recovering and separating such metals from different types of waste streams.

BACKGROUND OF THE INVENTION

Treatment and reduction of concentration of metals in metal bearing industrial waste streams to environmentally acceptable levels has been a long term problem. It is important to be able to treat such wastes and remove metals, hazardous materials, and toxic substances, with minimal amounts of solid wastes remaining in a cost effective manner. The ultimate solution to such environmental problems, recovery, recyclying, and reuse of metals contained within waste streams has been inadequately addressed.

In those instances where metals, compounds, and hazardous materials are not separated from waste streams, but are transported to special waste disposal facilities for treatment or storage, the metals are not recovered, leaving them to be disposed of with other unprocessed or partially processed wastes. As a result, not only is there no recycling with the attendant potential for economic profit or cost reduction, but waste disposal and waste storage problems are created as well. Such waste disposal and waste storage problems are associated with high cost and long waste storage time periods. Often, the wastes generated are considered to be hazardous. Under many environmental statutes, hazardous, toxic, and/or dangerous wastes remain the liability of the waste generator, as long as these wastes exist in the environment. Such long term liability remains with the generator, even though the wastes may have been treated and placed in a secure landfill for disposal.

Processes for removing metals from waste streams including ion exchange and electrolysis have heretofore been known, but theses process are limited. Ion exchange is costly, slow, and cumbersome to use, and in order to be effective, the waste water being treated must be passed through a significant amount of ion-exchange resin, usually in the form of a filter bed, making it effective, in most cases, for only treating small volumes of waste water. The complex fabrication process and sophisticated synthetic chemistry required by ion exchange metal recovery technology significantly contributes to the expense of its use to purify liquid waste streams. The cost and complexity of ion exchange also limits the variety of resins available.

Although ion exchange resin beds may be regenerated, the waste waters from regeneration must often be retreated to remove bulk contaminants and then usually passed through the ion exchange resin again to eliminate hazardous materials. Thus, ion exchange is a cumbersome process, and therefore impractical, especially for large volumes of waste water in a continuous-treatment process, as compared to using ion-exchange in a batch-treatment process.

Electrolysis is also expensive, requires significant maintenance, employs other resources, may create its own waste disposal problems and is energy intensive. Electrolytic recovery is, at best, 70%–80% efficient. Besides, the electrolyte systems available today are very sensitive to the presence of contaminants.

Use of either ion exchange or electrolytic recovery of metals from waste streams requires separation of streams for processing, thereby ultimately creating. multiple waste streams. This multiplicity of streams results in a costly waste removal process for the waste stream generator.

In contrast to the ion exchange and electrolyte metal recovery processes, one of the more acceptable technologies for treating waste water is based on a setting process, using fixating agents such as hydroxides and sulfates. The fixating chemicals are added to water in a settling tank to absorb or otherwise transform the contaminants into materials which settle equipment and permits the processing of large volumes of waste waters, without adding materials which would result in an environmentally undesirable effluent stream. However, in many cases, use of ordinary settling processes fails to reduce contaminant concentrations to levels low enough to meet the statutory requirements, without using excessive amounts of materials, over a protracted processing time. Current settling processes often produce undesirably large quantities of solid hazardous or toxic wastes in the form of sludge. The sludge cannot, for the most part, be effectively regenerated. Thus, using current settling techniques for waste water treatment, the resulting sludge product is yet another waste material that must be disposed of in a secure landfill without benefit of recycling. In turn, this process results ultimately in the necessity to clean the environment in the long term future.

As a result of problems associated with the above noted technologies, waste water generators have been forced to consider alternative methods which employ the addition of metal complexing agents to waste water streams and sludge of various industrial process.

For example, U.S. Pat. No. 3,966,601 (Stevenson, et al.) discloses a purification process comprised of mixing a soluble heavy metal salt and a heavy metal dithiocarbamate. U.S. Pat. No. 4,387,034 (Unger, et al.) discloses a collector for use in concentrating metal values in ores by flotation, the collector being comprised of a mixture of O-isopropyl N-ethylthionocarbamate and o-isobutyl N-methylthionocarbamate.

U.S. Pat. No. 4,578,195 (Moore, et al.) discloses a process for treating aqueous effluents to remove polluting metallic elements wherein the effluent is contacted with a poly (dithiocarbamate) chelating agent. U.S. Pat. No. 4,612,125 (Elfline) discloses a method for removing heavy metals from waste water streams, comprising treating the waste water with sulfur-containing compounds, such as sodium trithiocarbamate.

U.S. Pat. No. 4,678,584 (Elfline) discloses a method for treating a liquid containing a heavy metal comprising contacting the liquid with a mixture of sodium diethyldithiocarbamate and sodium tri-thiocarbanate. U.S. Pat. No. 4,943,377 (Legare) discloses a method for removing heavy metals from waste effluents comprising mixing the effluents with a solution of a sulfur compound such as sodium polythiocarbamate. U.S. Pat. No. 5,372,726 (Stratent) discloses a method for treating water polluted by metal ions comprising the steps of adding thiocarbamide, potassium or sodium hydroxide, and potassium or sodium hyposulfite.

U.S. Pat. No. 5,264,135 (Mohn) discloses a method for treating sludge from industrial waste water streams comprising the steps of adding a metal complexing agent to the sludge such as dimethyl-dithiocarbamate or a salt thereof. The metal complexing agent is added to a sludge thickening tank prior to de-watering in a filter press to form a sludge that contains 60% to 85% moisture by weight. Mohn does not disclose use source separation of the effluent throughout the process and does not disclose adjusting the pH of the waste solution to the optimal point of insolubility for the various metals involved. Mohn characterizes the sludge as being fixated, thereby allowing disposal in landfills.

In addition, a number of metallurgical processes for recovering metal have also been disclosed. For example, U.S. Pat. No. 3,899,322 (Yosim et al.) discloses a process for recovery of noble metals from scrap comprising melting the scrap at a temperature between 800° F. and 1,800° F. U.S. Pat. No. 4,135,923 (Day) discloses a process for the extraction of metals from metallic materials comprising heating a lead-free mixture of metals and separating the metals in a molten state.

U.S. Pat. No. 5,008,017 (Kiehl, et al.) discloses a process for recovering metals from waste liquids, including a step for obtaining pure metal. A dewatered sludge is heated for a period from about thirty minutes to about one hour at 900° F., to recover substantially pure silver. However, this metallurgical process for recovering metals form a metallic sludge is very complicated, and requires a metal complexing agent be applied to the metallic sludge of waste streams.

None of the known prior art technologies separate and also recover a variety of metals from one or more waste streams in order to use the metals as valuable commercial products, nor do they disclose the recovery, recycling, and reuse of the recovered metals. In those prior art processes using reagents to cause fixation of metals and to produce a fixated hydroxide sludge byproduct, the resulting byproducts must be sent to and disposed of in a secure landfill or alternative receiving site.

For the foregoing reasons, there is a need for a method for removing, separating, and recovering metals and groups of metals, such as transition metals, alkali metals, and alkaline earth metals. An efficient method for removing, separating, and recovering such metals in a cost effective manner with a high degree of recovery from waste streams and with minimal amounts of unprocessed solids and sludge remaining in the environment is needed.

Illustrative, but not limitative, of the precious and non-precious metals and other compounds that such a method can be capable of separating, removing and recovering are aluminum, antimony, arsenic, barium, beryllium, calcium, chromium, cobalt, copper, gold, iron, lead, magnesium, manganese, mercury, nickel, platinum, potassium, silver, sulfates, tin, vanadium, zinc, and the like. Such a process should also be capable of removing such metals and compounds from waste streams with at least 50% removal.

SUMMARY OF THE INVENTION

The present invention is directed to a method for recovering and separating precious and non-precious metals from hazardous and non-hazardous industrial waste streams. The method of the present invention removes, separates, and recovers such metals in a cost effective manner with more than 95% removal from waste streams and with minimal amounts of unprocessed solids and sludge remaining in the environment.

The method of the present invention for separating and recovering precious and non-precious metals and other compounds from industrial waste stream generally comprises: adjusting the pH of an industrial waste stream containing the precious and non-precious metals and other compounds to be recovered; adding a metal complexing agent to said waste stream to form metal ions of the metals to be recovered; adding a particle growth enhancer to promote the aggregation of said metal ions; adding a flocculating agent to increase the particle size of said metal ions and form a solution thereof; dewatering said solution to form a sludge and a supernatant; dewatering and drying said sludge to form a metal concentrate; and, melting said concentrate to selectively remove and recover a desired metal therefrom.

It has also been found that the method of the present is applicable to the recovery of desired metals and other compounds generated from different waste sources. For example, the method of the present invention has been found to be useful in treating waste streams originating from existing and abandoned mines, operating and active mines and other are exctraction processes, contaminated ground water, standing contaminated water such as is found in ponds, lagoons, pits, and the like, waste streams containing low level radioactive metals, and waste streams having a high degree of solids in solution as well as treating water intended for potable use and separating and recovering metals and other compounds from polluted or contaminated air.

DETAILED DESCRIPTION OF THE INVENTION

In accordance with the present invention, a method for recovering and separating metals from waste streams, comprises the following steps:

pH of a waste stream is adjusted;
a metal complexing agent is added;
an aggregating agent is added;
a flocculating agent is added resulting in a solution;
the solution effluent is then dewatered, preferably using a plate and frame press, resulting in a sludge and a supernatant; and
metals are recovered from the sludge upon melting, drying and dewatering a filter cake with melting enhancers so as to permit selective removal of a fused metal-bearing concentrate for casting into ingots to be sold to primary smelters.

A suitable base such as sodium hydroxide (NaOH) or calcium hydroxide (Ca(OH)2) or a suitable acid such as hydrochloric acid (HCl) can be used to alter the solubility of the metal or compound to be recovered preferably from about 7 to about 12, depending upon the initial pH of the waste stream to be treated and the metal(s) or compound(s) desired to be recovered.

The metal complexing agent that can be used comprises a mixture of a carbamate compound, an inorganic base, and water. The carbamate that can be employed are those selected from the group consisting of thiocarbamates, dithiocrbamates, alkylthiocarbamates such as dimethyldithiocarbamate and diethyldithiocarbamate, and salts thereof. The inorganic bases that can be used are those selected from the group consisting of sodium hydroxide, calcium hydroxide, potassium hydroxide, and the like. A preferred complexing agent comprises a mixture consisting of about 40% by weight sodium dimethyldithiocarbamate; about 10% by weight sodium hydroxide; and, about 50% by weight water.

The aggregating agent is employed to promote an ionic exchange with the metal in solution and to provide a foundation upon which the ionic metal particles can grow.

The preferred particle growth enhancer used is an aqueous solution of calcium chloride comprising about fifty pounds (50lbs.) calcium chloride dissolved in about 100 gallons (gals.) of water in combination with an ionic exchange promoter. The ionic exchange promoter employed is ferric chloride (FeCl3) which is commercially obtained as a 38% liquid solution. The amount of ionic exchange promoter used can range from about 0.03% to about 0.4% by volume.

The flocculating agents employed in the method of the present invention are commercially obtained material typically available as solid, granular ionic polymers having a medium anionic charge. These flocculating agents, together with the particle growth enhancer and the ionic exchange promoter, cause the ionic metals in solution to increase in size and weight, precipitate, and settle. Illustrative flocculating agents that can be used include Clarifloc A-3020 available from Poly Pure, Inc., Parsippany, N.J.; Floculite 402 available from Dubois, Cincinnati, Ohio, and J. Flock 711 available from Jamestown Chemical, Westhaven, Conn. The flocculating agent is prepared as a diluted aqueous solution consisting of one pound of the flocculating agent in 65 gallons of water and then further diluting this concentrate in 200 gallons of water. This dilute solution is then used in concentrations of from about 0.01% to about 0.01% by volume. The preferred flocculating agent employed is Clarifloc A-3020.

When the industrial waste stream to be treated contains organic compounds, they are initially degraded or destroyed by using a suitable oxidizing agent such as sodium hypochlorite, hydrogen peroxide at 35% to 50% concentration, ultra violet (UV) radiation or ozone (O3). When an oxidizing agent is used, the waste stream should be monitored to assure that an oxygen reduction potential (ORP) of about +350 mv is achieved and maintained for a period of about 15 minutes before treating the waste stream with the method of the invention.

Similarly, when the industrial waste stream to be treated is found to contain chelating agents (e.g., hexavalent chromium) these agents are initially degraded or destroyed by using a suitable reducing agent such as sodium metabisulfite, sodium sulfide, and the like. The waste stream should be monitored until the presence of the undesirable chelating agent can no longer be detected.

The method of the invention includes the following steps:

a. Waste streams to be treated are analyzed to determine the types of wastes and metals present, whether the waste streams contains precious metals or non-precious metals; volatile organic compounds (VOCs); solids above 5% by volume, chromium above an average of 15 parts per million (ppm); and cyanise, All incoming wastes are classified by priority metal which in a given waste solution to be treated, is the metal found most prominently. The most prominent metal is analytically identified. For example, a waste solution containing 1000 ppm of copper and 200 ppm of cadmium has copper as the priority metal and cadmium as the secondary metal.

b. Incoming waste streams are separated according to the priority metal, identified by the analytical procedures for each respective waste stream. Waste solutions with common dominant metals are mixed together for processing. For example, a solution containing 1000 ppm or more of copper is mixed only with a waste solution containing a priority metal of copper, since to do otherwise would reduce the concentration of copper in the final metal recovery product. Recovery product is sold to primary smelters based on the level of the priority metal. As the priority metal is removed, the secondary metals are all concentrated and the process moves to the next level based on the new priority metal selected from the remaining waste solution. Thus, a continuing recycling process takes place removing each priority metal successively.

c. The pH of the waste streams is adjusted, as required, to increase insolubility of the priority metal with ionically bonded compounds and to precipitate ionic metal particles upon addition of a reagent.

The optimum pH level will vary from 7 to 12 depending on the priority metal being addressed in the waste solution. For purposes of selective separation, the priority metal is the most prominent metal determined by analysis, i.e., the metal which the aforementioned analysis reveals to be present in the highest concentration.

d. The reagent, in the form of a metal complexing agent is added to chelate certain metals from ionically bonded compounds. These metals will ultimately be removed and recovered from the waste water. The metal complexing agent comprising a dithiocarbamate and preferably comprising about 40% sodium dimethyl dithiocarbamate, about 10% sodium hydroxide (NaOH) and about 50% water is used.

e. In the continuous treatment process described herein, 30 gallons of the aqueous calcium chloride particle growth enhancer solution is first added to a primary reaction tank containing 1,400 gallons of waste water as described herein below. When the contents of the tank are processed, $CaCl_2$ is added to the flash mix tank continuously.

f. When the ferric chloride ionic exchange promoter is used, it is added to the primary reaction tank used during the continuous treatment process and is also added directly to the tank in the batch treatment process.

g. Sodium hydroxide (NaOH) or calcium hydroxide $Ca(OH)_2$ is added to the mix, the choice of which to use depends on the solution's sensitivity of pH change. A solution which is heavily buffered (resistant to pH of change) is first treated with $Ca(OH)_2$ and then fine-tuned with NaOH. On the other hand, a solution that has little or no buffering and is thus sensitive to pH change, will be adjusted with NaOH only. The hydroxide is added to adjust pH to the optimum level for the priority metals, as discussed more fully below;

h. As described above, flocculating agents are added to the mix, as described below, to cause the ionic metallic precipitant to increase in size and weight and settle.

As the diluted working solution is used, proportional amounts of the flocculant concentrate and water are added to replenish the working tank as make-up flocculating agent.

The flocculant polymer solution is added to the continuous treatment process by injecting it into the flash mix tank on a continuous basis. The amount of flocculant polymer added is in proportion to the amount of dissolved and suspended solids in the waste being treated. The flocculant is preferably used in concentrations ranging from about 0.0001% to about 0.01%.

i. Oxidation and reduction are used, as required. Waste solutions containing both hexavalent chromium and cyanide ions, such as certain plating solutions, requires oxidation first and reduction second to ensure that metal separation is complete. Thus, there are cases requiring both oxidation and reduction.

In those cases where oxidation and/or reduction is required prior to processing the wastes, the wastes are first processed in a batch operation as described under "Batch Treatment" below.

j. Heavy particles settle, resulting in a sludge and the supernatant is clarified and discharged. The sludge is thickened and dewatered, and metals are recovered from the resulting thickened and dewatered sludge as described below.

k. The present invention recovers metals in the form of a dried powder. The metal-recovered dried powder may be either melted as specified and preferred in the present invention or, alternatively, the metal-recovery dried powder may be sold to the smelter, where the product is used as a feed stock in place of a virgin product in the smelting operation.

The final and preferred step in the metal recovery of the present invention occurs with the melting of the metal compounds. A flux, preferably a mixture of sodium tetra borate pentahydrate and soda ash, is added to facilitate this melting step. Sodium tetra borate decahydrate and sodium tetra borate anhydrous may be used in place of sodium tetra borate pentahydrate. The metal compounds are melted and then allowed to cool, resulting in solid recovered metal products.

The resulting metals are recovered and separated by priority metal and are sold to secondary and primary smelting operations. The present invention provides the raw material feed stock for the smelting recovery of the metals recovered as ionic compounds from waste streams. For example, a recovered product containing copper as the primary metal is sold to a primary copper smelter.

Waste streams containing large amounts of metals such as concentrations equal to or greater than 2000 ppm (0.02% dissolved solids) and specified solutions such as photographic wastes are treated in batch. In the batch treatment, all operations occur in the same treatment vessel, i.e., a volume of waste is placed in a tank, reagent is added, and the solution is allowed to settle, leaving the clean supernatant at the top and prepared and/or ready for discharge.

In comparison to batch treatment, continuous treatment is used for waste solutions and in those cases where the volume of the waste stream is in excess of 2000 gallons. In continuous treatment the waste solution is treated in different tanks, each tank being used generally for a different purpose. The wastes are moved from one tank to another allowing sufficient residence time for the solution to be processed in each tank and for the required chemical processes to take place. Solutions move at rates varying from about 5 gallons per minute [gpm] to about 5000 gpm depending on the level of dissolved solids being removed from the solution.

In continuous treatment, the wastes are moved from a primary treatment tank to a flash mix tank, to a flocculation tank, then to a gravity settler tank, then to a filtration system, and finally to discharge. The solids that settle in the gravity settler are continuously removed to a sludge settling tank prior to de-watering. Continuous treatment operation is used to move large volumes of waste containing low levels of dissolved contaminants rapidly through treatment.

Both the continuous treatment and batch treatment operations produce sludge. The amount of sludge produced is directly related to the amount of dissolved metal in the incoming waste. As an example, a solution containing one pound of dissolved salts will produce approximately one pound of sludge. Moreover, an input containing 60,000 mg/liter of copper and 0.15 mg/liter of lead would be typically left with 0.8 mg/liter copper and 0.02 mg/liter lead, which means that 59,999.02 mg/liter copper and 0.13 mg/liter lead could be recovered by the process of the present invention. In such case, the recovery rate for copper is 99.9987% and for lead 86.666%.

CONTINUOUS TREATMENT OPERATION

In continuous treatment, incoming wastes are analyzed and are placed in a tank depending on the level of metal in the waste stream, volume to be handled and the reagents needed to cause metal separation.

Details of the continuous treatment process are as follows:

a. The waste stream is analyzed.

b. All incoming waste streams are classified by priority metals.

c. A solution containing a priority metal of copper, for example, is adjusted to a pH of 6 plus of minus 1 with an acceptable pH variation of plus or minus 1, i.e., a pH range of from about 5 to about 7. The pH is adjusted using NaOH, $Ca(OH)_2$ or HCL depending on the initial pH of the waste stream.

d. Once the pH of the waste is adjusted to the desired level, the metal complexing agent of the present invention is added. The waste being treated is allowed to mix with the metal complexing agent for about ten minutes. As above described, the complexing agent preferably comprises about 40% sodium dimethyldithiocarbamate, about 10% sodium hydroxide and about 50% water.

e. After mixing the wastes being treated with the metal complexing agent, calcium chloride solution is added and allowed to mix with the waste for another ten minutes. The amount of calcium chloride added depends on the level of dissolved metals in the solution being treated.

f. Ferric chloride can be added, as required.

g. Additional pH adjustment, using sodium hydroxide or calcium hydroxide may be required. The solution is then fed to a flash mix tank at a rate of from about 5 gpm to about 50 gpm, depending on the amount of dissolved and suspended solids where additional calcium chloride and flock are added.

Where the total suspended and dissolved solids are below 0.01% the flow rate could be 50 gpm. This flow rate decreases proportionally as the level of dissolved and suspended solids increases, to where a concentration of 0.5% will require a flow rate of approximately 5 gpm. Flow rates are dependent on the level of dissolved and suspended solids and the type of equipment being used.

h. The solution then travels to the flocculation tank where it is thoroughly mixed allowing particle size growth. The residence time in the flocculation tank is dependent on the level of dissolved solids in the waste solution being treated. The tanks used are sized to allow a minimum of 10 minutes residence time at a flow rate of 50 gpm. For the flocculating reagent to work properly, a minimum residence time of 10 minutes is required in 1,400 gallons for proper mixing and reaction.

i. After the required residence time in the flocculation tank, the waste is fed to a flash mix tank where additional calcium chloride is injected into the waste stream to act as a binder to which the precipitated particles bind and begin to form particles of increasing size.

j. The solution is then passed into a clarification chamber with sufficient surface area to allow the heavy particles to settle to the bottom of the clarification chamber. Clean or clarified solution is removed from the top of the clarification chamber and passing thereafter into a send filter to remove any small particulate matter that escaped the flocculation and settlement stages and then the effluent goes to a discharge monitoring tank for pH monitoring and discharge.

k. At this point, the solution is fed to the gravity settling tank where the supernatant is separated from the solids. The solids settle to the bottom and are removed to the sludge thickening tank prior to dewatering. The supernatant flows to the filter and finally to discharge. Solid heavy material is removed from the bottom of the settlement chamber periodically. The settlement chamber, or gravity settler tank is one in which clarification of the solution occurs by a process of settlement. The resulting solid or sludge is placed in a sludge thickening tank where it is further settled into a conical shaped bottom of a large holding tank. As solids accumulate at the bottom of this settlement tank, they are drawn off by a pump and moved into a plate and frame filter press for dewatering. During this operation, excess water is removed from the sludge. The excess water is recirculated back into the treatment system for further use.

l. This process produces an ionic metallic sludge with high metal concentrations without the use of large quantities of reagents such as hydroxides, sodium borohydrate that would be placed in landfill for disposal. De-watered sludge is removed from the filter press. This material can contain between 25% and 50% moisture by weight. The dewatered sludge or filter cake is placed in infra-red dryers where the moisture content is brought down to less than 20% by weight. The dryers operate at temperatures of between about 350° F. to about 600° F. depending on the metal content and the desired level of moisture for the recovered product. The resulting volume of recovered metal powder is reduced over the previous de-watering step by as much as 30% to 50% by volume. The drying process drives off the moisture and other compounds that are not metallic leaving the metals in the resulting dry materials heavily concentrated.

m. The recovered dried metal powder is now converted to metallic metal by melting the recovered metal powder in gas-fired or electrical induction melting ovens. The melting process is conducted in two stages and depending on the feed stock, can produce recovered metal ingots of from about 50 to about 90 percent purity.

After de-watering and drying, the recovered metal powder is either sold as a commodity or is further converted to metal ingots. To convert the recovered metal powder to metal, which may be in the form of ingots, the powder is placed into the melting oven where additional reagents are mixed with the recovered metal powder. The reagents added are sodium tetra borate pentahydrate and soda ash.

Sodium tetra borate pentahydrate is added to the powder to cause the metals to liquefy once they reach the melting point. Soda ash is used to cause the metal to separate from the flux. Flux is the combination of the soda ash and sodium tetra borate pentahydrate (borax) used during the melting process.

The powder is first mixed with sodium tetra borate pentahydrate and melted to cause a reduction in volume and produce a homogenous mixture of metal and borax. This mixture is poured, cooled and re-melted in a second melting oven where soda ash is added to cause separation in the melted state. This material is poured and allowed to cool.

Once cooled, the recovered metal, which has settled to the bottom of the mold is separated from the slag comprised of the flux layer that is on top of the recovered metal. The slat is reused in the next melt.

For those melts that produce clean black slag, the black slag is sold as a cleaning compound. For those melts that produce a semi pure slag, the slag is sold along with the metal to a primary smelter purchasing the recovered metal.

The temperature in the melting oven is brought up to approximately 1800° F. and the materials are allowed to melt until it is verified that all the material in the crucible is liquid. This usually takes from 2–4 hours depending on the temperature of the oven when it is first charged. For example, a melt from a cold oven will take about 4 hours, whereas a melt from a hot oven will usually take about 2 hours. At this point, the molten materials are poured into a cast iron buggy or mold that has been pre-heated and coated with carbon to prevent the molten material from sticking to the buggy walls. The purpose of the preheating is to drive out any residual moisture and ensure that the surface is not cold when pouring in the molten bath. If the mold were cold, it might break from the sudden heat change or it might cause the molten bath to spray molten slag out of the mold.

The material is allowed to cool and solidify at which time the resulting solid is removed from the buggy and separated in two different layers. The material is then placed into a second melting oven where the temperature is brought up to approximately 1800° and two additional reagents are added, to induce the material to separate into three layers.

The lower layer consists of 60% to 90% of the recovered metal such as copper or nickel. The second or middle layer consists of pig iron containing all of the remaining metals, and the top layer consists of slag, i.e., the flux containing the two reagents that were added, one to each melt. The resulting products from this operation are solid and are commercially recycled thus completing the recycling of the components in the wastes. These materials can then be sold as feed stock for primary smelting operations.

The above noted procedures to produce recovered metal ingot are representative of each time the sludge is removed from the filter process. The amount of sludge removed is directly related to the amount of dissolved salts in the waste at the beginning of the metal recovery process. For example, a solution containing 1 pound of dissolved salts produces approximately 1 pound of sludge.

BATCH TREATMENT

Batch treatment takes place in one of a number of different tanks and is a process that may be completed in the starting tank. A cycle of operations is completed, and the effluent is removed for discharge, while the metal recovery products are either removed or utilized for future batch processes, and the cycle is repeated.

This batch recovery method is used for solutions containing precious metals above 250 mg/liter and for non-precious metal solutions containing concentrations of a priority metal above 0.2% (2,000 mg/liter).

In the batch process, one cycle of operations is completed and the effluent is removed for discharge to the sewer while the metal recovery products are either removed or utilized for future batch process and the cycle is repeated.

Upon completion of analysis and selective separation of priority metals by the aforementioned processes, wastes containing precious metals are treated, as follows:

a. All wastes containing precious metal with low chromium content, generally less than 10 ppm of chromium, are placed in a separate tank dedicated to such wastes and are subjected to batch treatment operations.

b. Chromium present in wastes at levels greater than approximately 10 ppm interferes with removal of other metals from solution. When the chromium concentration of waste to be treated is generally greater than about 10 ppm, the waste must be separated from other waste treatment. All wastes containing precious metals with high chromium content are placed in a separate batch treatment tank to undergo batch treatment for high chromium and precious metals. The high chromium waste is then separately treated as elsewhere described herein.

EXAMPLES

The following illustrative examples are set forth to demonstrate the utility of the present invention of a number of different waste streams.

Example 1

Example 1 illustrates treatment of a solution containing cyanide and metals in concentrations more than 500 mg/liter.

Large volumes are handled in an appropriate size tank. The waste is transferred to the treatment tank using an air activated diaphragm pump. The waste is then tested for pH and Oxygen Reduction Potential (ORP).

The solution is maintained at a pH above 10.5 with the addition of caustic while the cyanide is oxidized using oxidizing reagents to maintain an alkaline state within the solution. When the solution reaches and maintains the desired ORP for the desired length of time, a sample is taken and analyzed for cyanide content. This method controls the generation of heat and prevents uncontrolled chemical reactions. When all the cyanide has been oxidized and the batch is low enough in metal content, any remaining wastes are integrated into the regular treatment for metal recovery.

If the metal level is above 1000 mg/liter, the batch will be completed in the same treatment tank. If the metal level is less than 1000 mg/liter, the solution is fed into a continuous treatment operation containing the same priority metal.

All unused oxidizer is driven off from the solution by reducing the pH to a point where the oxidizer will be liberated as a gas. The liberated gas is trapped by an air scrubbing system attached to the treatment tanks and neutralized prior to being discharged to the atmosphere. This prevents the oxidizer from neutralizing the metal complexing agents that will be added to the solution during this operation.

The ionic metal will drop out of the solution and become particulate matter. To increase the rate of settlement, the pH of the solution will be adjusted to an ideal point of insolubility for the priority metal and a bindery agent such as calcium chloride will be added.

The solution is allowed to mix for a predetermined time at which point a polymer is added to cause the particles to increase in size. At this point, mixing is terminated and the solution is allowed to settle. The clean effluent or supernatant is removed for monitoring and discharge, while the ionic metal sludge that settled to the bottom of the tank is removed and placed in the sludge thickening tank prior to de-watering, drying and melting. Table I illustrates details regarding quantities of reagents added:

TABLE I

Treatment Reagents for Example 1

| Step | Operation | Reagent | Quantity |
|---|---|---|---|
| 1 | 100 gallons | $H_2O$ | 3:1 |
| 2 | pH to 8 | $Ca(OH)_2$ | 30 gr. |
| 3 | Complexing Agent | $NA_2S$ | 1 gal. |
| 4 | Complexing Agent | * | 0.5 gal. |
| 5 | pH 9.5 | $CA(OH)_2$ | 3 gr. |

Elemental analysis of Example 1 metals:

| Element | Amount | Measurement Procedure (United States Government) |
|---|---|---|
| Arsenic | <0.050 | SW-846 6010 ICP |
| Aluminum | 2362.000 | SW-846 6010 ICP |
| Barium | 68.690 | SW-846 6010 ICP |
| Beryllium | <0.001 | SW-846 6010 ICP |
| Cadmium | 0.010 | SW-846 6010 ICP |
| Hexavalent Chromium | <0.001 | SM17-418.1 UV |
| Copper | 418.000 | SW-846 6010 ICP |
| Iron | 203.400 | SW-846 6010 ICP |
| Lead | 3.280 | SW-846 6010 ICP |
| Manganese | 1.030 | SW-846 6010 ICP |
| Mercury | 0.073 | SW-846 7470 AA |
| Nickel | 0.500 | SW-846 6010 ICP |
| Phenol | <0.020 | SW-846 9065 UV |
| Selenium | <0.050 | SW-846 6010 ICP |
| Silver | 9.480 | SW-846 6010 ICP |
| Zinc | 0.620 | SW-846 6010 ICP |

The physical analysis of Example 1 is:

| Physical Attributes | Results | Measurement Procedure (United States Government) |
|---|---|---|
| Color | Dark Brown | |
| Cyanide | <0.02 | SW-846 9010 |
| Flash Point | >200° F. | SW-846 1010 |
| Odor | None | |
| pH | −0.21 | SW-846 9040 |
| Percent Solids | <1% | SM17 2540b & 2540D |
| Specific Gravity | 1.02 | |
| Total Petroleum Hydrocarbons | NA | SM17 418.1 |
| Viscosity | Medium | |
| Layers When Standing | 1 | |
| Percent Moisture | NA | |

Example 2

In this example, a metal waste stream containing hexavalent chromium is treated. The pH of the solution is reduced to less than 2.0. A reducing agent such as sodium metabisulfate is added and allowed to react with the waste for approximate 20 minutes to ensure complete contact and reduction of the hexavalent chromium to trivalent chromium.

The pH of the solution is adjusted to 3.5 and a volume of the metal complexing agent will be added. The pH will rise with this addition and the ionic metal will drop out of the solution and become particulate matter. To increase the rate of settlement, the pH of the solution will be adjusted to the ideal point of insolubility for the priority metal and a bindery agent such as calcium chloride will be added.

The solution will be allowed to mix for a predetermined time at which point a flocculating agent will be added to cause the particles to increase in size. Mixing will be terminated, and the solution will be allowed to settle. The clean effluent or supernatant will be removed for monitoring and discharged to the sewer while the ionic metal sludge that settled to the bottom of the tank will be removed and placed in the sludge thickening tank prior to de-watering, drying and melting.

Table II below sets forth the details of the reagents used:

TABLE II

Treatment Reagents for Example 2

| Step | Operation | Reagent | Quantity |
|---|---|---|---|
| 1 | 100 gallons | $H_2O$ | 10:1 |
| 2 | Reduce | $NaHSO_3$ | 25 lbs./100 gal. of wastes |
| 3 | pH 7.00 | $CaOH_2$ | 60 lbs/100 gal. of waste |
| 4 | Complexing Agent | $NA_2S$ | 0.2 lbs./1000 gal. of waste |
| 5 | Complexing Agent | * | 0.2 gal./1000 gal. of waste |
| 6 | Coagulant 1 | $CaCl_2$ | 5 gal./100 gal. of waste |
| 7 | Coagulant 2 | Flocculating Agent | ¼ lbs. per 100 gal. |

*40% sodium dimethyl-dithiocarbamate, 10% sodium hydroxide and 50% water

Elemental analysis of Example 2 metals:

| Element | Results | Measurement Procedure (United States Government) |
|---|---|---|
| Arsenic | 20.00 | SW-846 6010 ICP |
| Aluminum | 7232.00 | SW-846 6010 ICP |
| Barium | <0.01 | SW-846 6010 ICP |
| Beryllium | 5.30 | SW-846 6010 ICP |
| Cadmium | 108.60 | SW-846 6010 ICP |
| Chromium | 32070.00 | |
| Hexavalent Chromium | 146.60 | SM17-418.1 UV |
| Copper | 146.60 | SW-846 6010 ICP |
| Iron | 685.70 | SW-846 6010 ICP |
| Lead | <0.01 | SW-846 6010 ICP |
| Manganese | 22.3 | SW-846 6010 ICP |
| Mercury | | SW-846 7470 AA |
| Nickel | 340.90 | SW-846 6010 ICP |
| Phenol | | SW-846 9065 UV |
| Selenium | <0.05 | SW-846 6010 ICP |
| Silver | 74.10 | SW-846 6010 ICP |
| Zinc | 393.30 | SW-846 6010 ICP |

The physical analysis of Example 2 is:

| Physical Attributes | Results | Measurement Procedure (United States Government) |
|---|---|---|
| Color | Dark Brown | |
| Cyanide | <0.02 | SW-846 9010 |
| Flash Point | >200° F. | SW-846 1010 |
| Odor | None | |
| pH | −0.21 | SW-846 9040 |
| Percent Solids | <1% | SM17 2540b & 2540D |
| Specific Gravity | 1.02 | |
| Total Petroleum Hydrocarbons | NA | SM17 418.1 |
| Viscosity | Medium | |
| Layers When Standing | 1 | |
| Percent Moisture | NA | |

Example 3

This example describes the treatment process of a precious metal bearing solution containing chromium.

The pH of the solution is reduced to less than 2.0 with the addition of hydrochloric acid (HCl). A reducing agent such as sodium meta-bisulfate is added to reduce the chromium. The solution is then agitated for approximately 20 minutes to ensure complete contact and reduction of the chromium.

The pH of the solution is then increased to greater than 10.5 with the addition of caustic reagents and a quantity of sodium hypochlorite is added to oxidize any remaining chelating reagents. The oxidizer is added in small quantities to prevent over feeding.

The pH is allowed to stabilize for approximately 15 minutes and is then adjusted to a pH of 7.5, as necessary. If the pH drifts, additional pH stabilization is implemented.

Metal complexing reagents are added to the solution in sufficient quantity to cause all of the dissolved metal to precipitate out of the solution.

After the desired settlement time, the solution is checked for metal content. Upon completion of the settlement process, the clean effluent is removed for monitoring prior to discharge, and the ionic metal sludge is removed to a conical-bottomed sludge thickening tank prior to de-watering and drying.

When the sludge is transferred from the treatment tank to the conical-bottomed sludge thickening tank, a portion of the liquid is also transferred, in order to facilitate the transfer. Allowing separation of sludge from transfer liquid in the conical-bottomed thickening tank is simply called "sludge thickening" and the tank in which it is accomplished is so named.

Example 4

This example relates to a precious metal bearing solution (such as photographic processing waste) without chromium. Recovery of the metals from this type of solution is conducted in a batch operation for control over the recovered product, reuse of the recovered product as a seed for the next operation, cost of the complexing agent, keeping the solution from outside contaminants and complying with regulations that exempt precious metal recovery.

All material is placed in a large common holding tank. In this case, the tank has a capacity of 7,000 gallons, is closed topped and vented to the atmosphere through a permitted air scrubber. Once a sufficient quantity of material is placed in the holding tank, samples are obtained from the top and bottom of the tank. These samples are analyzed for metal content.

A bindery agent such as calcium chloride is mixed by dissolving approximately 50 pounds of it in 100 gallons of water and the resulting solution is fed into the holding tank by pumping it in through the bottom of the tank so as to ensure mixing and adequate contact with the solution in the holding tank.

Based on the metal content, i.e., the concentration of suspended and dissolved metals determined to be present in the solution by chemical analysis, the metal complexing agent is fed into the holding tank by being pumped in from the bottom to ensure adequate contact with the solution in the tank. The amount of complexing and bindery agents added to the batch is directly related to the level of metal in the batch. For example, a 7,000 gallon batch containing 3,000 mg/liter of dissolved metal requires approximately 12 gallons of metal complexing agent and 100 gallons of bindery agent to bring the metal levels to below 2 mg/liter of combined metals. The tank is agitated from the bottom with air from an air pump for approximately 30 minutes to ensure adequate mixing of the bindery agent, metal complexing agent and the solution in the tank. The contents of the tank are then allowed to settle for approximately three to six hours, after which time samples are obtained from the top and bottom of the tank for chemical analysis. Alternatively, the metal complexing agent can be added to the tank by itself to cause the separation and in such a case, $CaCl_2$ is not used.

Based on the analytical results which, under normal operating conditions shows that the solution is clean, the clean effluent is removed by use of an electric centrifugal pump for pH monitoring prior to discharge. Monitoring occurs in a discharge holding tank just prior to sewer discharge.

The precipitated metal sludge is allowed to remain at the bottom of the tank as a seed for the next batch to be processed in this tank. Under normal conditions, this seed remains for five to six cycles before it is removed and the cycle is started over.

When the metal sludge generated in this batch operation is removed from the processing tank, the sludge is placed into fifty-five gallon holding drums for storage prior to being processed in a dedicated filter press. Effluent from the filter press operation is returned to the dedicated batch process tank and reused.

De-watered solids from this operation are placed directly into a silicon carbide crucible in a melting oven, where the solids are blended with a flux, i.e., sodium borate tetra pentahydrate and soda ash. For each 40 pounds of recovered product that is placed in the first oven for stage one of the melting process, approximately three pounds of sodium tetra borate pentahydrate are added. For each melt in stage two of the melting process, approximately 9–12 pounds of soda ash are added.

The melting oven is brought up to approximately 1800° F. and monitored. Once it is determined that the batch is in a homogenous liquid state by stirring, the contents of the crucible are poured into a cast iron buggy (mold) that has been pre-heated and coated with a carbon water solution to prevent sticking of the molten material. The mold is allowed to cool for 18 hours and the contents are removed and separated into three components.

Noble metal (usually 95% or higher concentration silver), pig iron and slag is recovered. Both the silver and pig iron are placed into a second melting oven where additional soda ash is added and the oven is brought to approximately 1800° F. Once it is determined that the batch is molten by stirring the bath, approximately one pound of black iron is added to the molten bath and allowed to completely melt. The bath is then stirred to verify that the black iron has melted.

After stirring is completed, the molten bath is poured into a preheated buggy (mold) that has been coated with carbon black to prevent the molten material from sticking to the sides of the mold. The mold is allowed to cool for approximately 14 hours at which time the mold is emptied.

The recovered products are removed from the mold and separated into three layers consisting of a noble metal such as silver with a purity of from 97% to 99.9%, a layer of pig iron containing all of the impurities, i.e., aluminum, cadmium, chromium, cobalt, copper, iron, manganese, nickel and zinc), and a layer of black slag.

The black slag is recycled two to three times in the same operation before it is sold as a scrubbing compound. The pig iron and silver are both sold for their metal content completely recycling all of the components within the incoming waste that caused the material to be classified as waste.

Table III below sets forth the percentage of recovery for those metals analyzed in the incoming waste of Example 4.

TABLE III

| ELEMENT | INCOMING WASTE | SUPERNATANT AFTER RECOVERY | PERCENTAGE OF RECOVERY |
| --- | --- | --- | --- |
| Arsenic | <0.050 | <0.050 | 0.000% |
| Antimony | <0.050 | <0.050 | 0.000% |
| Aluminum | 248.400 | 1.773 | 99.287% |
| Barium | <0.001 | <0.001 | 0.000% |
| Beryllium | <0.001 | <0.001 | 0.000% |
| Calcium | 385.500 | 265.300 | 31.258% |
| Cadmium | 1.560 | <0.002 | 99.872% |
| Chromium | 0.230 | <0.005 | 97.826% |
| Cobalt | 1.160 | <0.003 | 99.741% |
| Copper | 167.900 | <0.002 | 99.999% |
| Iron | 762.700 | <0.005 | 99.993% |
| Lead | <0.025 | <0.025 | 60.000% |
| Magnesium | 396.500 | 17.540 | 95.576% |
| Manganese | 161.900 | 0.250 | 99.846% |
| Mercury | <0.020 | <0.020 | 0.000% |
| Nickel | 1.310 | <0.010 | 99.237% |
| Phenol | <0.020 | <0.020 | 0.000% |
| Potassium | 16.340 | 8.230 | 49.633% |
| Selenium | 0.060 | <0.050 | 16.667% |
| Silver | 0.010 | <0.003 | 70.000% |
| Sulfate | 8596.000 | 3400.000 | 60.447% |
| Thallium | 0.800 | <0.020 | 82.500% |
| Vanadium | 0.470 | <0.020 | 95.745% |
| Zinc | 570.000 | <0.004 | 99.993% |

Example 5

This example illustrates application of the method of the invention to recover metals and compounds from the liquid waste streams of abandoned or existing mines as well as operating and active mines and other ore extraction processes.

Using an appropriate extraction system such as pumps, the liquid mine waste or process effluent from a mine is fed to a facility that treats the liquid mine waste or process effluent with a method of the invention, i.e., either the continuous or the batch method. The resulting clean effluent can then be reused in the mining process or discharged into the ground water table or a sewage system or introduced into a potable water distribution system.

Thus, operating and active mines can increase the efficiency of their ore extraction processes by incorporating the method of the invention directly into the mining process to realize a greater percent of removal of metals from the virgin ore materials.

The metals and other compounds that can be recovered are shown in Table IV below.

TABLE IV

| COMPOUNDS/ METALS | INFLUENT (ppm) | EFFLUENT (ppm) |
| --- | --- | --- |
| Arsenic | 0.848 | <0.050 |
| Antimony | 0.050 | <0.050 |
| Aluminum | 310.500 | 1.773 |
| Barium | 0.101 | <0.001 |
| Beryllium | 0.072 | <0.001 |
| Calcium | 385.500 | 265.300 |
| Cadmium | 1.693 | <0.002 |
| Chromium (Total) | 0.001 | <0.005 |
| Cobalt | 1.160 | <0.003 |
| Copper | 204.600 | <0.002 |
| Iron | 1053.000 | <0.005 |

TABLE IV-continued

| COMPOUNDS/ METALS | INFLUENT (ppm) | EFFLUENT (ppm) |
|---|---|---|
| Lead | 0.071 | <0.025 |
| Magnesium | 396.500 | 17.540 |
| Manganese | 176.100 | <0.250 |
| Mercury | <0.020 | <0.020 |
| Nickel | 0.085 | <0.010 |
| Phenol | <0.020 | <0.020 |
| Potassium | 16.340 | 8.230 |
| Selenium | 0.253 | <0.050 |
| Silver | 0.133 | <0.003 |
| Sulfate | 8596.000 | 3400.000 |
| Thallium | 0.800 | <0.020 |
| Vanadium | 0.470 | <0.020 |
| Zinc | 649.100 | <0.004 |

Example 6

This example illustrates the application of the method of the invention to recover metals and compounds from contaminated groundwater.

Depending upon the subsurface hydro geologic conditions, including the nature of the hydraulic gradient across the contaminated plume to be treated, a system of deep well and shallow well points is created downstream or down gradient from the source of contamination and completely intercept the contaminated plume. Any insoluble or volatile organic matter is first segregated and removed from the contaminated groundwater using conventional screening and settling techniques. The contaminated groundwater is then fed to a facility containing either the continuous or batch method of the invention for removal and recovery of metals and other compounds from the contaminated groundwater to recover clean, uncontaminated water which can then be further processed for use a s potable water. The clean, uncontaminated water can also be delivered to a well at the foot of the system to form a pressure ridge that facilitates the formation of an upcoming effect in the water table and thus prevents the contaminated plume from migrating past the system treatment area. The metals and other compounds recovered can be separated and refined using conventional methods.

Table V below illustrates the metals and other compounds that can be recovered using this method.

TABLE V

| COMPOUNDS/ METALS | INFLUENT (ppm) | EFFLUENT (ppm) | RECOVERED MATERIAL (ppm) | PERCENT OF RECOVERY (%) |
|---|---|---|---|---|
| Arsenic | <0.050 | <0.050 | <0.050 | 0.000* |
| Antimony | <0.050 | <0.050 | <0.050 | 0.000* |
| Aluminum | 1238.000 | 5.536 | 46,690.000 | 99.553 |
| Barium | 0.027 | 0.001 | 6.720 | 96.296 |
| Beryllium | 0.045 | <0.001 | 2.575 | 100.000 |
| Calcium | 405.500 | 694.100 | 162,100.000 | 71.171# |
| Cadmium | 0.941 | <0.002 | 42.580 | 100.000 |
| Chromium | 32.970 | 0.030 | 1,613.000 | 99.909 |
| Cobalt | 3.510 | 0.185 | 131.100 | 94.729 |
| Copper | 3.680 | 0.040 | 158.900 | 98.913 |
| Iron | 378.000 | 0.126 | 13,600.000 | 99.967 |
| Lead | <0.025 | <0.025 | <0.025 | 0.000 |
| Magnesium | 1,193.000 | 115.100 | 38,600.000 | 90.352 |
| Manganese | 174.800 | 0.256 | 7,103.000 | 99.854 |
| Nickel | 6.700 | 0.015 | 323.600 | 99.716 |
| Selenium | <0.050 | <0.050 | 8.360 | 0.000 |

TABLE V-continued

| COMPOUNDS/ METALS | INFLUENT (ppm) | EFFLUENT (ppm) | RECOVERED MATERIAL (ppm) | PERCENT OF RECOVERY (%) |
|---|---|---|---|---|
| Silver | 0.106 | <0.003 | 14.670 | 100.000 |
| Thallium | <0.020 | <0.020 | <0.020 | 0.000 |
| Vanadium | 0.822 | <0.020 | 35.960 | 100.000 |
| Zinc | 17.400 | 0.013 | 802.200 | 99.925 |

*Indicates the absence of the material in the influent and effluent.
This level increased due to the use of lime during pH adjustment.

Example 7

This example illustrates the use of the method of the invention to obtain potable water.

Using conventional techniques, the water intended for potable use is first treated to remove or segregate insoluble and volatile organic matter. Nitrates are then removed from the water and ionic aluminum or ionic iron is then added to improve color, reduce turbidity and destroy bacteria.

The thusly treated water is then fed to a facility of the invention; i.e., either the continuous or the batch method, to remove metals and other compounds as a sludge, if necessary, and the effluent is treated with lime-soda or subjected to ionic exchange treatment or further treated with a method of the invention to remove excess calcium and magnesium to a desired level of from about 75 to about 120 mg/l calcium carbonate level.

The effluent is then filtered using conventional methods such as granulated active carbon to remove residual particulate matter and offensive tastes or odors. The effluent is then disinfected by chlorination using such compounds as chlorine, sodium per chlorate, calcium per chlorate, and the like, to reduce pathogens to an acceptable level.

The effluent is then ready to be incorporated into a potable water distribution system while the sludge is treated according to the method of the invention to recover commercial grade metals.

Example 8

This example illustrates the use of the batch method of the invention as an in situ application to remove metals and other compounds from standing, contaminated water such as from ponds, lagoons, pits, and the like.

A physical and chemical analysis of the contaminated water is first ascertained and the specific hydraulic, geophysical and geochemical conditions of the contaminated water are determined. Concurrently with or subsequent to mixing, the reagents of the batch method of the invention are then introduced into the in situ contaminated water and permitted to react for a period of time sufficient for the metals and other compounds to aggregate and settle as a sludge at the bottom of the standing water. Using conventional pumps, the sludge is then extracted and dried and the metals recovered in commercial grade as described hereinabove. The cleaned water can then be left standing, be reused as process water, be discharged into the ground, be discharged into the sewerage system, or be introduced into a potable water distribution system.

Example 9

This example illustrates the application of a method of the invention to treat waste streams containing more than 2% by weight solids in solution by introducing the metals contained in the waste streams into a liquid solution from which the metals can then be remediated, recovered and separated.

In this method, the waste stream to be treated is first isolated or diverted and insoluble and volatile organic matter is removed using conventional techniques. The resultant solid waste is then washed with water or exposed to an acid matrix until a homogeneous solution The homogeneous solution is then fed to a facility and subjected to either the continuous or the batch method of the invention to recover metals of commercial quality while the resultant effluent can be discharged into the ground, or into a sewerage system, or introduced into a potable water distribution system.

Example 10

This example illustrates the application of the method of the invention in conjunction with a conventional, commercial air scrubber to remove and recover metals from polluted or contaminated air.

As desired or required, the incoming air to be treated can be filtered before being fed into the scrubber. The scrubber used is typically a wet collector scrubber; e.g., a venturi-cyclone type, which is capable of enabling the reagents used in the method of the invention to contact the polluted or contaminated air either in the form of an aqueous solution or as an aerosol spray. Thus, the invention reagents are introduced into the scrubber effluent to remain in contact with the contaminated or polluted air for a time sufficient for the metals and other compounds to be removed to aggregate and fall to the bottom of the scrubber in the form of a sludge. The sludge is then removed from the scrubber, dried and treated as described hereinabove to recover metals of commercial quality while the resultant clean effluent can be discharged into the ground or into a sewerage system or introduced into a potable water distribution system.

Example 11

This example illustrates use of the method of the invention to recover electroless nickel and electroless copper used in conventional plating processes.

The waste stream to be treated is fed to a facility and subjected to either the continuous or batch method of the invention which is adapted to recover electroless nickel or electroless copper. For the recovery of electroless nickel or electroless copper, the pH of the waste stream is adjusted to from about 6.0 to about 8.5 and then reduced with sodium sulfate and ferrous sulfate. Calcium chloride is then added as an aggregating agent followed by the addition of a flocculent to form a sludge. The metals; i.e., nickel or copper, are then recovered from the sludge as described hereinabove.

Example 12

This example illustrates the application of the invention to recover low level radioactive metals from waste streams.

The waste stream containing the low level radioactive metals are delivered to a chamber where the waste stream is subjected to either the continuous or the batch method of the invention and recovery of the metals from the resultant sludge is as descerided hereinabove. Accordingly, recovery of such low level radioactive metals as cesium, strontium, thorium and radium can be realized in amounts greater than about 50% while recovery of low level radioactive metals such as uranium, plutonium, americium, neptunium and cobalt can be realized in amounts greater than about 95%. In addition, recovery of radioactive isotopes of such metals as nickel, lead, iron, silver and chromium can also be realized in amounts greater than about 95%.

Example 13

This example illustrates the use of the method of the invention for fixating, removing, separating and recovering metals from solid and soil wastes.

If required, the contaminated soils or solids are extracted from their residence and then mixed with a liquid or powder containing a high concentration of the reagents used in the batch method of the invention. After thorough mixing, the metals become fixated and entrained in the solids or soil and are analagous to ore materials extracted from the ground. The solids or soil containing the fixated metals can then be subjected to an extraction process to remove the metals and the cleaned solids or soil can be returned to the ground while the extracted metals can be subjected to primary or secondary smelting operations to recover the metals.

Example 14

This example utilizes the technique of the method of the invention to fixate sulfates in situ. By utilizing the method of the invention, metals are prevented from leaching out of the soil by fixating the compounds primarily responsible for lowering the pH of the groundwater. Typically, sulfates present in subsurface strata will cause the pH of groundwater flowing over them to become acidic. The acidic groundwater flow, in turn, dissolves metals and other elements present in the soil into solution thereby creating a continuous waste problem.

In this technique, an aqueous slurry containing from about 40% to about 50% barium carbonate is introduced into the groundwater table upstream from the target compounds. The natural flow of the groundwater disperses the slurry and causes a plume of the reagent to form and subsequently react with the sulfates in the soil thereby fixating up to about 90% of the sulfates in situ. The remaining dissolved metals and other elements can then be extracted using conventional pumps and fed to a facility for treatment with a method of the invention to separate and remove the metals from the fixated sulfates.

Although the present invention has been described in considerable detail and with reference to certain preferred embodiments thereof, other variations are possible. Therefore, the spirit and scope of the appended claims should not be limited to the description of the preferred embodiments contained herein.

What is claimed is:

1. A process for separating and recovering metals from liquid mine waste and mine process effluent comprising:
   (a) feeding liquid mine waste to and mine process effluent into a chamber in the form of a waste solution;
   (b) adjusting the pH of said waste solution to from about 3.5 to about 10.5;
   (c) adding a metal complexing agent to said waste solution to form metal ion complexes of the metals in said waste solution, said metal complexing agent being a mixture of water, an inorganic base selected from the group consisting of sodium hydroxide, calcium hydroxide and potassium hydroxide, and a thiocarbamate or dithiocarbamate selected from the group consisting of dimethyldithiocarbamate, diethyldithiocarbamate and the salts thereof;
   (d) adding a flocculating agent and calcium chloride as an aggregating agent to said waste solution to cause said metal ion complexes to precipitate in the form of a sludge and leave a clean effluent;

(e) dewatering and drying said sludge to a substantially anhydrous state;

(f) melting said dewatered and dried sludge to recover said metals therefrom; and, (g) discharging said clean effluent into the ground water table, a sewerage system, or a potable water distribution system.

2. The process of claim 1, wherein said metals are selected from the group consisting of precious and non-precious metals.

3. The process of claim 1 wherein said pH is adjusted to from about 5 to about 9.

4. A process for separating and recovering metals from contaminated groundwater comprising:

(a) intercepting a contaminated plume downstream from a source of contaminated water;

(b) segregating and removing insoluble and volatile organic matter from said intercepted contaminated plume to form a substantially liquid stream of said contaminated groundwater;

(c) feeding said liquid stream of contaminated groundwater to a chamber;

(d) adjusting the pH of said liquid stream of contaminated groundwater to from about 3.5 to about 10.5;

(e) adding a metal complexing agent to said liquid stream of contaminated groundwater to form metal ion complexes of the metals in said contaminated groundwater, said metal complexing agent being a mixture of water, an inorganic base selected from the group consisting of sodium hydroxide, calcium hydroxide and potassium hydroxide, and a thiocarbamate or dithiocarbamate selected from the group consisting of dimethyldithiocarbamate, diethyldithiocarbamate, and the salts thereof;

(f) adding a flocculating agent and calcium chloride as an aggregating agent to said liquid stream of contaminated groundwater to cause said metal ion complexes to precipitate in the form of a sludge and leave clean, uncontaminated water;

(g) dewatering and drying said sludge to a substantially anhydrous state;

(h) melting said dewatered and dried sludge to recover said metals therefrom in solid form; and, (i) discharging said clean, uncontaminated water for further processing for use as potable water or to the foot of said contaminated plume such that said contaminated plume is prevented from further migration.

5. The process of claim 4 wherein said metals are selected from the group consisting of precious and non-precious metals.

6. The process of claim 4 wherein said pH is adjusted to from about 5 to about 9.

7. A process for separating and recovering metals from a water source intended for use as potable water comprising:

(a) segregating and removing insoluble and volatile organic matter from said water source;

(b) removing nitrates from said water source;

(c) adding ionic aluminum or ionic iron to said water source to improve the color, reduce the turbidity and destroy bacteria in said water source;

(d) adding a metal complexing agent to said water source to form metal ion complexes of the metals in said water source, said metal complexing agent being a mixture of water, an inorganic base selected from the group consisting of sodium hydroxide, calcium hydroxide and potassium hydroxide, and a thiocarbamate or dithiocarbamate selected from the group consisting of dimethyldithiocarbamate, diethyldithiocarbamate, and the salts thereof;

(e) adding a flocculating agent and calcium chloride as an aggregating agent to said water source to cause said metal ion complexes to precipitate in the form of a sludge and leave a cleaned water source;

(f) dewatering and drying said sludge to a substantially anhydrous state;

(g) melting said dewatered and dried sludge to recover said metals therefrom in solid form;

(h) treating said cleaned water source to remove excess calcium and magnesium to a level of from about 75 to about 120 mg/l calcium carbonate;

(i) filtering said cleaned water source to remove residual particulate matter and offensive tastes and odors therefrom; and, (j) disinfecting said cleaned water source to reduce the pathogens remaining therein to an acceptable level for potable use.

8. The process of claim 7 wherein said metals are selected from the group consisting of precious and non-precious metals.

9. The process of claim 7 wherein said pH is adjusted to from about 5 to about 9.

10. A process for separating and recovering metals from contaminated standing water comprising:

(a) pumping said contaminated standing water into a chamber;

(b) adjusting the pH of said contaminated standing water to from about 3.5 to about 10.5;

(c) adding a metal complexing agent to said contaminated standing water to form metal ion complexes in said contaminated standing water, said metal complexing agent being a mixture of water, an inorganic base selected from the group consisting of sodium hydroxide, calcium hydroxide and potassium hydroxide, and a thiocarbamate or dithiocarbamate selected from the group consisting of dimethyldithiocarbamate, diethyldithiocarbamate, and the salts thereof;

(d) adding a flocculating agent and calcium chloride as an aggregating agent to said contaminated standing water to cause said metal ion complexes to precipitate in the form of a sludge;

(e) removing said sludge from said chamber so that cleaned water remains therein;

(f) dewatering and drying said sludge to a substantially anhydrous state;

(g) melting said dewatered and dried sludge to recover said metals therefrom in solid form; and, (h) discharging said cleaned water from said chamber.

11. The process of claim 10 wherein said metals are selected from the group consisting of precious and non-precious metals.

12. The process of claim 10 wherein said pH is adjusted to from about 5 to about 9.

13. A process for separating and recovering metals from waste streams containing more than about 2% by weight solids in solution comprising:

(a) diverting and isolating a portion of said solids containing waste stream;

(b) removing insoluble and volatile organic matter from said solids containing waste stream to produce a substantially solid waste residue;

(c) washing said solid waste residue until a homogeneous waste stream solution is obtained;

(d) feeding said homogeneous waste stream solution into a chamber;

(e) adjusting the pH of said waste stream solution to from about 3.5 to about 10.5;

(f) adding a metal complexing agent to said waste stream solution to form metal ion complexes in said waste stream solution, said metal complexing agent being a mixture of water, an inorganic base selected from the group consisting of sodium hydroxide, calcium hydroxide, and potassium hydroxide, and a thiocarbamate or dithiocarbamate selected from the group consisting of dimethyldithiocarbamate, diethyldithiocarbamate, and the salts thereof;

(g) adding a flocculating agent and calcium chloride as an aggregating agent to said waste stream solution to cause said metal ion complexes to precipitate in the form of a sludge and leave remaining an effluent;

(h) dewatering and drying said sludge to a substantially anhydrous state;

(i) melting said dewatered and dried sludge to recover said metals therefrom in solid form; and, (j) discharging said effluent into the ground, a sewerage system, or a potable water distribution system.

14. The process of claim 13 wherein said metals are selected from the group consisting of precious and non-precious metals.

15. The process of claim 13 wherein said pH is adjusted to from about 5 to about 9.

16. A process for separating and recovering electroless nickel and electroless copper from electroplating waste streams comprising:

(a) feeding an electroplating waste stream containing electroless nickel and electroless copper into a chamber;

(b) adjusting the pH of said waste stream to from about 6.0 to about 8.5;

(c) adding sodium sulfate and ferrous sulfate as reducing agents to said waste stream;

(d) adding a flocculating agent and calcium chloride as an aggregating agent or a thiocarbamate or dithiocarbamate selected from the group consisting of dimethyldithiocarbamate, diethyldithiocarbamate and the salts thereof as a precipitating agent to said waste stream to cause said electroless nickel and electroless copper to precipitate in the form of a sludge;

(e) dewatering and drying said sludge to a substantially anhydrous state; and, (f) melting said dewatered and dried sludge to recover said electroless nickel and electroless copper therefrom in solid form.

17. A process for separating and removing radioactive metals from waste streams comprising:

(a) feeding a waste stream containing radioactive metals into a chamber;

(b) adjusting the pH of said waste stream to from about 3.5 to about 10.5;

(c) adding a metal complexing agent to said waste stream to form metal ion complexes of said radioactive metals, said metal complexing agent being a mixture of water, an inorganic base selected from the group consisting of sodium hydroxide, calcium hydroxide and potassium hydroxide, and a thiocarbamate or dithiocarbamate selected from the group consisting of dimethyldithiocarbamate, diethyldithiocarbamate, and the salts thereof;

(d) adding a flocculating agent and calcium chloride as an aggregating agent to said waste stream to cause said metal ion complexes to precipitate in the form of a sludge; and, (e) dewatering said sludge to a substantially anhydrous state.

18. The process of claim 17 wherein said radioactive metals are selected from the group consisting of cesium, strontium, thorium, radium, uranium, plutonium, americium, neptunium, cobalt, nickel, lead, iron, silver and chromium and other radioactive elements and/or isotopes.

19. The process of claim 17 wherein said pH is adjusted to from about 5 to about 9.

* * * * *